United States Patent Office 3,522,311
Patented July 28, 1970

3,522,311
ALKYLSULFINYLPROPANEDIOLS
Richard A. Hickner, Midland, Mich., assignor to Dow Chemical Company, Midland, Mich., a corporation of Delaware
No Drawing. Filed Apr. 15, 1968, Ser. No. 721,196
Int. Cl. C07c *147/14*; C08f *45/46*; B01f *17/38*
U.S. Cl. 260—607                                  6 Claims

ABSTRACT OF THE DISCLOSURE

Compounds have the structure $RSOCH_2CHOHCH_2OH$ where R is an alkyl group of 1-16 C atoms. Compounds in which R is 1-7 are plasticizers and those where R is 7-16 are biologically active surfactants. They are made by oxidizing the corresponding thioethers.

---

This invention relates to novel alkylsulfinyl-propanediols having the generic structure $RSOCH_2CHOHCH_2OH$ and to methods of their preparation and more particularly pertains to compounds of the above structure wherein R is an alkyl group of 1 to 16 C atoms, and to methods of preparing the novel compounds by oxidizing with a peroxide compound of the structure $$RSCH_2CHOHCH_2OH$$

wherein R, has the designation above.

Some of the new compounds of this invention are plasticizers and others are biologically active surfactants. An object of this invention is the provision of new compounds having the above generic formula and methods of making the compounds. The compounds in which R has 1-7 C atoms are plasticizers for vinyl polymers, such as polyvinyl alcohol and those with 8-16 C atoms and, preferably 11-14 C atoms, are surface active under acid, neutral and alkaline conditions.

Another object is provision of new compounds which have good foam producing properties and foam stability in acid, neutral and alkaline aqueous media.

Another object is the provision of surfactants which are compatible with other surfactants, such as alkyl benzene sulfonate or alcohol sulfates and salts thereof.

Another object is the provision of new compounds which are plasticizers for vinyl alcohol and cellulose ester polymers.

Still another object is the provision of surfactants which have varying biological activity, as will be shown hereafter.

The compounds of this invention can be made by oxidizing the thioether group of (alkylthio)propanediols to the corresponding sulfoxide.

The oxidizing agents which can be used to prepare compounds of this invention include organic or inorganic peroxides. Typical inorganic peroxides include $H_2O_2$, alkali metal peroxides or alkaline earth metal peroxides. Typical organic peroxides include the peroxides of monobasic carboxylic acids, such as peracetic or perpropionic acid, perbenzoic acid or peroxides of polycarboxylic acids, such as monoperphthalic acid.

The preferred peroxide is $H_2O_2$ because of its low cost, ready availability, the good results obtainable by its use and because its decomposition product ($H_2O$) is not deleterious to the reaction.

Typical (alkylthio)propanediols of the structure $$RSCH_2CHOHCH_2OH$$

which can be reacted to form the corresponding sulfoxides are $CH_3SCH_2CHOHCH_2OH$,
$C_2H_5SCH_2CHOHCH_2OH$,
$C_3H_7SCH_2CHOHCH_2OH$,
$C_4H_9SCH_2CHOHCH_2OH$,
$C_5H_{11}SCH_2CHOHCH_2OH$,
$C_6H_{13}SCH_2CHOHCH_2OH$,
$C_7H_{15}SCH_2CHOHCH_2OH$,
$C_8H_{17}SCH_2CHOHCH_2OH$,
$C_9H_{19}SCH_2CHOHCH_2OH$,
$C_{10}H_{21}SCH_2CHOHCHOH_2$,
$C_{11}H_{23}CH_2CHOHCH_2OH$,
$C_{12}H_{25}SCH_2CH_2OHCH_2OH$,
$C_{13}H_{27}SCH_2CHOHCH_2OH$, and
$C_{14}H_{29}SCH_2CHOHCH_2OH$ and mixtures of such (alkylthio)propanediols. The (alkylthio)propanediols can be prepared by reacting an alkyl chloride, bromide or iodide with an alkali metal mercaptan of the structure $MSCH_2CHOHCH_2OH$ where M is the alkali metal or by reacting an alkali metal salt of an alkyl mercaptan with 3-chloro-1,2-propanediol. The $C_3$–$C_{16}$ alkyl groups can be normal or branched chain.

The oxidation of the thioether to the sulfoxide can be effected either with or without a diluent. However, if the thioether and peroxide are both solids it is preferred to use as a reaction medium a diluent in which at least one and preferably both reactants are soluble. The proportion of peroxide to thioether should be such that at least one atom of oxygen is available for each thioether group. The preferred molar ratio of peroxides to (alkylthio)propanediol is 1.0–1.1 to 1.0.

The reaction temperature can range from about 0° to about 90° C. However for practical reasons a reaction temperature range of from about 25° C. to about 75° C. is preferred. The pressure at which the reaction takes place is not particularly critical, in that it can be run under atmospheric, sub-atmospheric or super atmospheric conditions.

The diluents which are useful are those which do not react appreciably with the peroxide or the (alkylthio)-propanediol and which will dissolve the reactants to an appreciable extent. Representative diluents are liquid alcohols, ketones, aromatic hydrocarbons, aliphatic hydrocarbons or water. The preferred diluents are lower monohydric alkanols because of their ready availability, low cost and easy separation from the mixture, as by distillation. Particularly preferred are methanol, ethanol and isopropanol.

Representative new compounds of this invention are—

$CH_3SOCH_2CHOHCH_2OH$
$C_2H_5SOCH_2CHOHCH_2OH$
$C_3H_7SOCH_2CHOHCH_2OH$
$C_4H_9SOCH_2CHOHCH_2OH$
$C_5H_{11}SOCH_2CHOHCH_2OH$
$C_6H_{13}SOCH_2CHOHCH_2OH$
$C_7H_{15}SOCH_2CHOHCH_2OH$
$C_8H_{17}SOCH_2CHOHCH_2OH$
$C_9H_{19}SOCH_2CHOHCH_2OH$
$C_{10}H_{21}SOCH_2CHOHCH_2OH$
$C_{11}H_{23}SOCH_2CHOHCH_2OH$
$C_{12}H_{25}SOCH_2CHOHCH_2OH$
$C_{13}H_{25}SOCH_2CHOHCH_2OH$
$C_{14}H_{25}SOCH_2CHOHCH_2OH$
$C_{16}H_{33}SOCH_2CHOHCH_2OH$ in which the $C_3$–$C_{16}$ alkyl groups attached to the sulfur atom are either straight or branched chains.

The examples which follow are intended to illustrate but not limit the invention. All parts are by weight unless otherwise specifically indicated.

EXAMPLE 1

A solution of 150 ml. methanol and 165 parts of a mixture containing approximately 29% by weight n-$C_7H_{15}SCH_2CHOHCH_2OH$, 47 weight percent $$n\text{-}C_8H_{17}SCH_2CHOHCH_2OH$$

and 22 weight percent of n-$C_9H_{19}SCH_2CHOHCH_2OH$ was heated to about 63° C. and 90 weight parts of a 30 weight percent $H_2O_2$ were added during one hour. The solution was maintained at 65° C. for an additional half hour. A starch-KI test at the end of this time was negative. The solvent was removed at reduced pressure and the residue was treated with hexane to remove unreacted thioether. The sulfoxide was an off-white waxy solid. It weighed 171 g., which represents a 96.5% yield.

EXAMPLE 2

The reaction temperature, solvent and general procedure of Example 1 was followed. A solution containing 204 weight parts of approximately 50/50 mixture of n-$C_9H_{19}SCH_2CHOHCH_2OH$ and $$C_{10}H_{21}SCH_2CHOHCH_2OH$$

was oxidized with about 1.05 molar equivalents of 30% aqueous $H_2O_2$. After reaction, the mixture was worked up by vacuum distilling solvent, and treating the residue with hexane. The n-$C_9H_{19}SOCH_2CHOHCH_2OH$ and $$n\text{-}C_{10}H_{21}SOCH_2CHOHCH_2OH$$

mixture, which was a white waxy solid, weighed 194 g.

EXAMPLE 3

A solution containing 191 g. of a mixture of approximately equal percentages of $C_{11}H_{23}SCH_2CHOHCH_2OH$, $$C_{12}H_{25}SCH_2CHOHCH_2OH$$

$C_{13}H_{27}SCH_2CHOHCH_2OH$ and $$C_{14}H_{29}SCH_2CHOHCH_2OH$$

in methanol was oxidized with 72 g. of 30 weight percent $H_2O_2$ by the procedure described in Example 1. After separation of solvent and washing with hexane, 205 g., substantially a theoretical yield, was obtained. The $C_{11-14}H_{23-29}SOCH_2CHOHCH_2OH$ mixture was a white waxy solid.

The surface active properties of these sulfoxides determined on 0.1% solutions in deionized water is listed below:

|  | Product of— | | |
|---|---|---|---|
|  | Ex. 1 | Ex. 2 | Ex. 3 |
| Surface Tension (dynes/cm.) | 28.9 | 25.7 | 26.9 |
| Interfacial Tension (dynes/cm.) | 5.5 | 2.0 | 3.2 |
| Foam Height (mm.) Initial | 56 | 118 | 27 |
| Percent Foam Stability | 25.0 | 84.7 | 78 |
| Wetting Time (minutes) | 1.75 | 0.18 | 0.80 |

These novel compounds serve as foam boosters as shown by the following experiment. Solutions were prepared containing 24% (by weight) of a linear alkyl benzenesulfonate in which the alkyl group averaged 12 C atoms, 8% of Alipal CO-436 (nonylphenol plus 4 ethylene oxide, ammonium sulfate ester, General Aniline and Film Co.), 5% ethanol and 60% water. Sample 1 contained no other additives, sample 2 contained the ingredients of sample 1 and 3% lauryl diethanolamide (a standard foam booster) while samples 3 and 4 contained the ingredients of sample 1 and 3% of the products from Examples 2 and 3, respectively. The foaming ability of 0.1% aqueous solutions of the samples determined using the Ross-Miles foam test are summarized below:

| Sample | 1 | 2 | 3 | 4 |
|---|---|---|---|---|
| Initial Foam Height (mm.) | 184 | 195 | 202 | 190 |
| Foam Height—5 Mins | 179 | 190 | 196 | 184 |
| Percent Foam Stability | 97 | 97 | 97 | 97 |

EXAMPLE 4

A solution of 27.2 parts of $C_2H_5SCH_2CHOHCH_2OH$ in 100 ml. of methanol was heated to 65° and 24 g. of 30 weight percent aqueous $H_2O_2$ was added slowly. The mixture was maintained at 65° C. for an additional 1.5 hours. At the end of this time the starch-KI test was negative. The solvent was removed under reduced pressure leaving a colorless, moderately viscous liquid which had a refractive index at 25° C. of 1.5075.

An aqueous solution of 5 weight parts of polyvinyl alcohol and 50 parts of water was prepared. To 11 parts of the solution was added 0.25 weight part of $C_2H_5SOCH_2CHOHCH_2OH$ and a 10 mil thick film was cast. The dried film showed that the polymer and plasticizer were compatible.

The compounds with the structure $$RSOCH_2CHOHCH_2OH$$

where R has 1–7 C atoms are all plasticizers for polyvinyl alcohol, cellulose ethers, such as ethyl or the propyl celluloses, and cellulose esters such as cellulose acetate, propionate or butyrate and mixtures thereof and cellulose esters having a mixture of the above carboxylic acid groups on the cellulose molecule.

I claim:
1. Compounds of the structure $RSOCH_2CHOHCH_2OH$ wherein R is an alkyl group of 1 to 16 C atoms, inclusive, and mixtures thereof.
2. Compounds of claim 1 in which R is an alkyl group of $C_7$–$C_{10}$, inclusive, and mixtures thereof.
3. Compounds of claim 1 in which R is an alkyl group of $C_1$–$C_7$, inclusive, and mixtures thereof.
4. Compounds of claim 1 in which R is an alkyl group of $C_1$–$C_4$, inclusive, and mixtures thereof.
5. Compounds of claim 1 in which R is an alkyl group of $C_{11}$–$C_{14}$, inclusive, and mixtures thereof.
6. Compounds of claim 5 in which compounds with alkyl group of 11–14 C atoms are admixed in substantially equal percentages.

References Cited

UNITED STATES PATENTS 3,210,243   10/1965   Goodhue et al. ___ 260—607 XR

CHARLES B. PARKER, Primary Examiner

D. R. PHILLIPS, Assistant Examiner

U.S. Cl. X.R.

252—353; 260—30.8, 609